US008086739B2

(12) United States Patent
Tripathi et al.

(10) Patent No.: US 8,086,739 B2
(45) Date of Patent: Dec. 27, 2011

(54) METHOD AND SYSTEM FOR MONITORING VIRTUAL WIRES

(75) Inventors: Sunay Tripathi, San Jose, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 525 days.

(21) Appl. No.: 11/953,842

(22) Filed: Dec. 10, 2007

(65) Prior Publication Data

US 2009/0150538 A1     Jun. 11, 2009

(51) Int. Cl.
| | |
|---|---|
| *G06F 15/16* | (2006.01) |
| *G06F 15/177* | (2006.01) |
| *G06F 15/173* | (2006.01) |
| *G06F 11/00* | (2006.01) |
| *G01R 31/08* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |

(52) U.S. Cl. ........ 709/227; 709/220; 709/221; 709/222; 709/223; 709/224; 709/225; 709/226; 370/229; 370/231

(58) Field of Classification Search .................. 709/203, 709/220–222, 223–227, 242–244; 370/229–236, 370/392–402
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 * | 7/2001 | Fletcher et al. | 709/224 |
| 6,477,643 B1 | 11/2002 | Vorbach et al. | |
| 6,594,775 B1 * | 7/2003 | Fair | 714/4 |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,771,595 B1 * | 8/2004 | Gilbert et al. | 370/229 |

(Continued)

FOREIGN PATENT DOCUMENTS

WO    2005057318 A2    6/2005

(Continued)

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

(Continued)

*Primary Examiner* — Carl Colin
*Assistant Examiner* — Catherine Thiaw
(74) *Attorney, Agent, or Firm* — Osha • Liang LLP

(57) ABSTRACT

In general, the invention relates to a method for monitoring virtual wires. The method includes selecting a first virtual wire to monitor, wherein the first virtual wire connects a first virtual network interface card (VNIC) located on a first computer to a second VNIC located on a second computer, where the first computer and the second computer are connected to a chassis, and where the first virtual wire is implemented by the chassis. The method further includes collecting usage statistics associated with the first virtual wire, and performing a first action using the collected usage statistics associated with the first virtual wire.

10 Claims, 9 Drawing Sheets

U.S. PATENT DOCUMENTS

| | | | |
|---|---|---|---|
| 6,831,893 | B1 | 12/2004 | Ben Nun et al. |
| 6,859,841 | B2 | 2/2005 | Narad et al. |
| 6,944,168 | B2 | 9/2005 | Paatela et al. |
| 6,985,937 | B1 | 1/2006 | Keshav et al. |
| 7,046,665 | B1 | 5/2006 | Walrand et al. |
| 7,111,303 | B2 | 9/2006 | Macchiano et al. |
| 7,146,431 | B2 | 12/2006 | Hipp et al. |
| 7,177,311 | B1 | 2/2007 | Hussain et al. |
| 7,200,704 | B2 | 4/2007 | Njoku et al. |
| 7,260,102 | B2 | 8/2007 | Mehrvar et al. |
| 7,313,142 | B2 | 12/2007 | Matsuo et al. |
| 7,450,498 | B2 | 11/2008 | Golia et al. |
| 7,502,884 | B1* | 3/2009 | Shah et al. .................. 710/316 |
| 7,561,531 | B2 | 7/2009 | Lewites et al. |
| 7,620,955 | B1 | 11/2009 | Nelson |
| 7,633,955 | B1 | 12/2009 | Saraiya et al. |
| 7,688,838 | B1 | 3/2010 | Aloni et al. |
| 7,694,298 | B2* | 4/2010 | Goud et al. .................. 718/1 |
| 7,730,486 | B2 | 6/2010 | Herington |
| 2002/0052972 | A1 | 5/2002 | Yim |
| 2002/0080721 | A1 | 6/2002 | Tobagi et al. |
| 2003/0037154 | A1 | 2/2003 | Poggio et al. |
| 2003/0120772 | A1* | 6/2003 | Husain et al. .................. 709/224 |
| 2004/0015966 | A1 | 1/2004 | MacChiano et al. |
| 2004/0170127 | A1 | 9/2004 | Tanaka |
| 2004/0199808 | A1 | 10/2004 | Freimuth et al. |
| 2004/0202182 | A1 | 10/2004 | Lund et al. |
| 2004/0210623 | A1 | 10/2004 | Hydrie et al. |
| 2004/0267866 | A1 | 12/2004 | Carollo et al. |
| 2005/0111455 | A1 | 5/2005 | Nozue et al. |
| 2005/0135243 | A1 | 6/2005 | Lee et al. |
| 2005/0138620 | A1 | 6/2005 | Lewites |
| 2005/0182853 | A1 | 8/2005 | Lewites et al. |
| 2005/0251802 | A1 | 11/2005 | Bozek et al. |
| 2006/0041667 | A1 | 2/2006 | Ahn et al. |
| 2006/0045089 | A1 | 3/2006 | Bacher et al. |
| 2006/0070066 | A1 | 3/2006 | Grobman |
| 2006/0092928 | A1 | 5/2006 | Pike et al. |
| 2006/0174324 | A1 | 8/2006 | Zur et al. |
| 2006/0206300 | A1* | 9/2006 | Garg et al. .................. 703/27 |
| 2006/0206602 | A1 | 9/2006 | Hunter et al. |
| 2006/0233168 | A1 | 10/2006 | Lewites et al. |
| 2006/0236063 | A1 | 10/2006 | Hausauer et al. |
| 2006/0253619 | A1 | 11/2006 | Torudbakken et al. |
| 2007/0047536 | A1* | 3/2007 | Scherer et al. .................. 370/360 |
| 2007/0078988 | A1* | 4/2007 | Miloushev et al. .......... 709/227 |
| 2007/0083723 | A1* | 4/2007 | Dey et al. .................. 711/163 |
| 2007/0101323 | A1 | 5/2007 | Foley et al. |
| 2007/0244937 | A1 | 10/2007 | Flynn et al. |
| 2007/0244972 | A1* | 10/2007 | Fan .................. 709/205 |
| 2008/0002683 | A1 | 1/2008 | Droux et al. |
| 2008/0005748 | A1* | 1/2008 | Mathew et al. .............. 719/318 |
| 2008/0019365 | A1 | 1/2008 | Tripathi et al. |
| 2008/0022016 | A1 | 1/2008 | Tripathi et al. |
| 2008/0043765 | A1* | 2/2008 | Belgaied et al. .............. 370/409 |
| 2008/0144635 | A1* | 6/2008 | Carollo et al. ................ 370/397 |
| 2008/0171550 | A1 | 7/2008 | Zhao |
| 2008/0192648 | A1 | 8/2008 | Galles |
| 2008/0225875 | A1 | 9/2008 | Wray et al. |
| 2008/0239945 | A1 | 10/2008 | Gregg |
| 2008/0253379 | A1 | 10/2008 | Sasagawa |
| 2008/0270599 | A1* | 10/2008 | Tamir et al. .................. 709/224 |
| 2009/0006593 | A1 | 1/2009 | Cortes |
| 2009/0125752 | A1 | 5/2009 | Chan et al. |
| 2010/0046531 | A1 | 2/2010 | Louati et al. |

FOREIGN PATENT DOCUMENTS

| | | | |
|---|---|---|---|
| WO | | 2008093174 A1 | 8/2008 |

OTHER PUBLICATIONS

Tripathi, S.; "CrossBow: Solaris Network Virtualization and Resource Control"; Crossbow Architectual Document, Nov. 21, 2006; 19 pages.

Nordmark, E. et al.; IP Instances Interface Document; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B. and Ramanathan, P: "HIP: Hybrid Interrupt-Polling for the Network Interface", ACM SIGOPS Operating Systems Review, col. 35, Iss. 4, Oct. 2001, (11 Pages).

International Search Report dated Aug. 19, 2009 (14 pages).

International Preliminary Report on Patentability issued in PCT/US2009/035405, Dated Sep. 10, 2010. (2 pages).

Goldenberg, D. et al.; "Zero Copy Sockets Direct Protocol over InfiniBand—Preliminary Implementation and Performance Analysis"; Proceedings of the 13th Symposium on High Performance Interconnects; Piscataway, NJ; Aug. 17-19, 2005; pp. 128-137 (10 pages).

"I/O Virtualization Using Mellanox InfiniBand And Channel I/O Virtualization (CIOV) Technology"; XP-002541674; Jan. 1, 2007; Retrieved from the Internet: <http://www.mellanox.com/pdf/whitepapersNVP_Virtualize_with_IB.pdf>; pp. 1-16 (16 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/Mellanox%20Technologies%20-%20Infiniband%20Software%20Stack%20-%20WinIB%20-%20external.PDF>; pp. 1-2 (2 pages).

Wheeler, B.; "10 Gigabit Ethernet In Servers: Benefits and Challenges"; XP-002541745; Jan. 1, 2005; Retrieved from the Internet: <http://www.hp.com/products1/serverconnectivity/adapters/ethernet/10gbe/infolibrary/10GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US2009/048594 dated Sep. 7, 2009 (5 pages).

Written Opinion from PCT/US2009/048594 dated Sep. 7, 2009 (7 page).

Popuri, S., OpenSolaris Virtualization Technologies, Feb. 23, 2007, Retrieved from the Internet,<hub.opensolaris.org/bin/view/Community+Group+advocacy/techdays%2Darchive%2D06%2D07>, 42 pages.

Kumar, R., ASI and PCI Express: Complementary Solutions, Dec. 1, 2004, RTC Magazine, Retrieved from the Internet <rtcmagazine.com/articles/view/100274>, (5 pages).

Martinez, R., Alfaro, F.J., and Sanchez, J.L., Providing Quality of Service Over Advanced Switching, Jan. 1, 2006, IEEE, Retrieved from the Internet, <ieeexplore.ieee.org/xpls/abs_all.jsp?arnumber=1655667tag=1>, 10 pages.

Apani, Brave New World, Feb. 1, 2007, iSmile, Retrieved from the Internet, <isimile.com/PDFs/Apani_Segmentation_WP.pdf>, 8 pages.

Trapeze, Trapeze Overview, Jan. 1, 1998, USENIX, Retrieved from the Internet, <usenix.org/publications/library/ proceedings/usenix98/full_papers/anderson/anderson_html/node4.html>, 2 pages.

Office Action in United States Patent and Trademark Office for U.S. Appl. No. 11/953,829, Mailed Aug. 4, 2010 (30 Pages).

Office Action in United States Patent and Trademark Office for U.S. Appl. No. 11/953,837, Mailed Jun. 11, 2010 (27 Pages).

Office Action in United States Patent and Trademark Office for U.S. Appl. No. 11/953,839, Mailed Aug. 19, 2010 (30 Pages).

Office Action in United States Patent and Trademark Office for U.S. Appl. No. 12/040,165, Mailed Feb. 8, 2010 (40 Pages).

Notice of Allowance in United States Patent and Trademark Office for U.S. Appl. No. 12/040,165, Mailed Oct. 29, 2010 (18 Pages).

Office Action in United States Patent and Trademark Office for U.S. Appl. No. 12/040,101, Mailed May 6, 2010 (39 Pages).

Final Office Action in United States Patent and Trademark Office for U.S. Appl. No. 12/040,101, Mailed Dec. 13, 2010 (25 pages).

Office Action in United States Patent and Trademark Office for U.S. Appl. No. 12/053,676, Mailed Dec. 9, 2009 (41 pages).

Office Action in United States Patent and Trademark Office for U.S. Appl. No. 12/040,105, Mailed Nov. 20, 2009 (93 Pages).

Final Office Action in United States Patent and Trademark Office for U.S. Appl. No. 12/040,105, Mailed May 26, 2010 (26 Pages).

Notice of Allowance in United States Patent and Trademark Office for U.S. Appl. No. 12/040,105, Mailed Oct. 5, 2010 (27 Pages).

Office Action in United States Patent and Trademark Office for U.S. Appl. No. 12/053,666, Mailed Dec. 10, 2009 (36 Pages).

Final Office Action in United States Patent and Trademark Office for U.S. Appl. No. 12/053,666, Mailed Jun. 11, 2010 (27 Pages).

Notice of Allowance in United States Patent and Trademark Office for U.S. Appl. No. 12/053,666, Mailed Oct. 7, 2010 (15 Pages).

Office Action in United States Patent and Trademark Office for U.S. Appl. No. 11/953,843, Mailed Oct. 15, 2010 (33 Pages).

Notice of Allowance in United States Patent and Trademark Office for U.S Appl. No. 12/053,676, Mailed Jul. 15, 2010 (20 Pages).

Office Action in United States Patent and Trademark Office for U.S. Appl. No. 11/953,843, Mailed May 3, 2010 (169 pages).

* cited by examiner

METHOD AND SYSTEM FOR MONITORING VIRTUAL WIRES

CROSS-REFERENCE TO RELATED APPLICATIONS

The present application contains subject matter that may be related to the subject matter in the following U.S. applications filed on Dec. 10, 2007, and assigned to the assignee of the present application: "Method and System for Creating a Virtual Network Path" with U.S. application Ser. No. 11/953,829; "Method and System for Controlling Network Traffic In a Blade" with U.S. application Ser. No. 11/953,832; "Method and System for Reconfiguring a Virtual Network Path" with U.S. application Ser. No. 11/953,837; "Method and System for Enforcing Resource Constraints For Virtual Machines Across Migration" with U.S. application Ser. No. 11/953,839; and "Method and System for Scaling Applications On A Blade Chassis" with U.S. application Ser. No. 11/953,843.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

SUMMARY

In general, in one aspect, the invention relates to a method and system for creating and managing a virtual network path between virtual machines in a network, wherein the virtual machines are located on different computers connected to a chassis interconnect.

In general, in one aspect, the invention relates to a method for monitoring virtual wires. The method includes selecting a first virtual wire to monitor, wherein the first virtual wire connects a first virtual network interface card (VNIC) located on a first computer to a second VNIC located on a second computer, wherein the first computer and the second computer are connected to a chassis, and wherein the first virtual wire is implemented by the chassis, collecting usage statistics associated with the first virtual wire, and performing a first action using the collected usage statistics associated with the first virtual wire.

In general, in one aspect, the invention relates to a non-transitory computer readable medium comprising a plurality of executable instructions for monitoring virtual wires, wherein the plurality of executable instructions comprises instructions to select a first virtual wire to monitor, wherein the first virtual wire connects a first virtual network interface card (VNIC) located on a first blade to a second VNIC located on a second blade, wherein the first blade and the second blade are connected to a blade chassis, and wherein the first virtual wire is implemented by the blade chassis, collect usage statistics associated with the first virtual wire, and perform a first action using the collected usage statistics associated with the first virtual wire.

In general, in one aspect, the invention relates to a method for monitoring a virtual network path. The method includes selecting the virtual network path to monitor, wherein the network path comprises a first virtual wire and a second virtual wire, wherein the first virtual wire connects a first virtual network interface card (VNIC) located on a first blade to a second VNIC located on a second blade, wherein the second virtual wire connects a third VNIC located on the second blade to a fourth VNIC on a third blade, wherein the second VNIC and third VNIC are associated with a first virtual machine on the second blade, wherein the first blade, the second blade, and the third blade are connected to a blade chassis, and wherein the first virtual wire and second virtual wire are implemented by the blade chassis, collecting usage statistics associated with the virtual network path, and performing an action using the collected usage statistics associated with the virtual network path.

Other aspects of the invention will be apparent from the following description and the appended claims.

DETAILED DESCRIPTION

Figure 1:
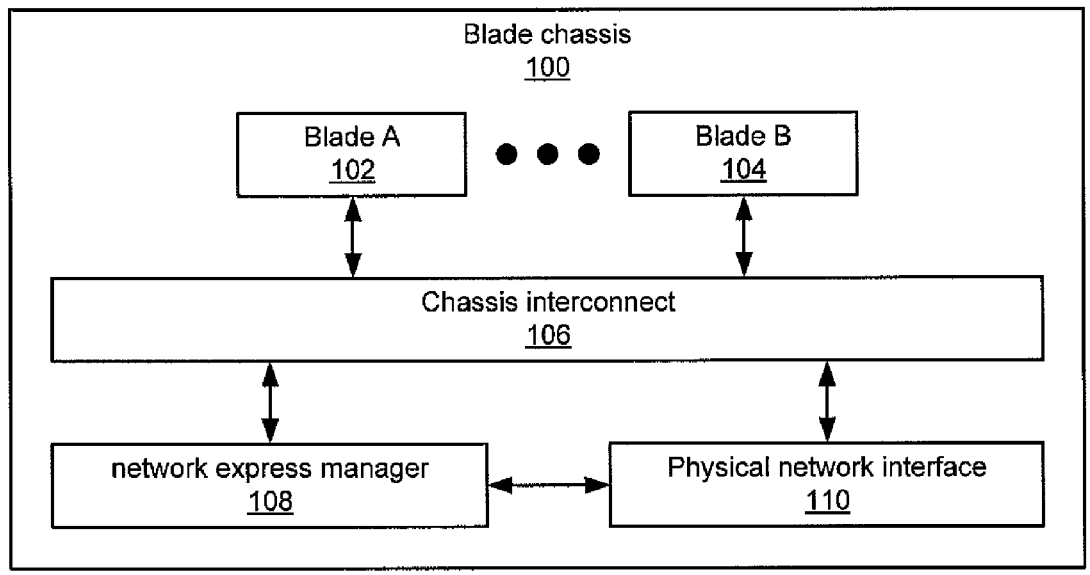
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for monitoring virtual wires in a blade chassis. More specifically, embodiments of the invention enable monitoring of network traffic over virtual wires, where the virtual wires connect two virtual network interface cards (VNICs) which reside on separate physical blades. Further, embodiments of the invention enable monitoring of multiple virtual wires on a per-virtual wire basis over the same physical connection.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
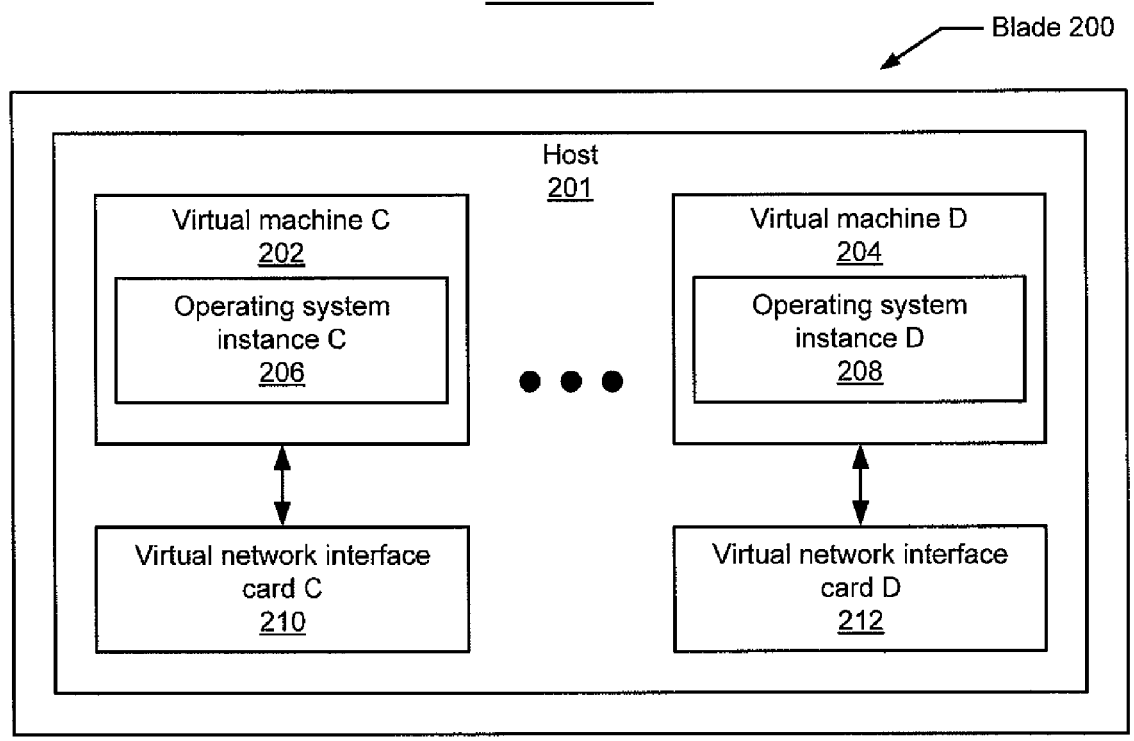
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one embodiment of the invention, fully featured stand-alone computer systems or conventional servers may also be used instead of or in combination with the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one embodiment of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines or and virtual execution environments to share the blade's (200) networking functionality. Further, in one or more embodiments of the invention, each virtual machine or and virtual execution environment may be associated with an arbitrary number of VNICs, thereby providing increased flexibility in the types of networking functionality available to the virtual machines and/or and virtual execution environments. For example, a virtual machine may use one VNIC for incoming network traffic, and another VNIC for outgoing network traffic. VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety.

VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

In one embodiment of the invention, one of the blades in the blade chassis includes a control operating system executing in a virtual machine (also referred to as the control virtual machine). The control operating system is configured to manage the creation and maintenance of the virtual wires and/or virtual network paths (discussed below). In addition, the control operating system also includes functionality to scale applications in the blade chassis (discussed below).

Figure 3:
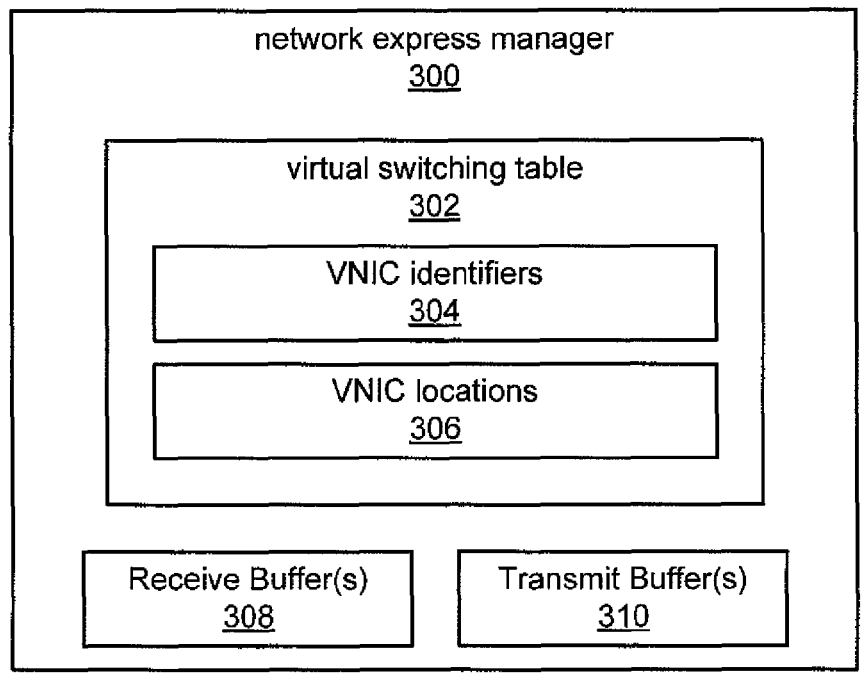
FIG. 3 shows a diagram of a network express manager in accordance with one or more embodiments of the invention.

Continuing with the discussion of FIG. 2, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). In another embodiment of the invention, the VNIC identifiers (304) may be media access control (MAC) addresses. Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). In one embodiment of the invention, once a determination is made about where to route a given packet, the packet is stored in the appropriate receive buffer (308) or transmit buffer (310). In one embodiment of the invention, each VNIC listed in the virtual switching table (302) is associated with a receive buffer (308) and a transmit buffer (310). The receive buffer (308) is configured to temporarily store packets destined for a given VNIC prior to the VNIC receiving (via a polling or interrupt mechanism) the packets. Similarly, the transmit buffer (310) is configured to temporarily store packets received from the VNIC prior to send the packet towards its packet destination.

In one embodiment of the invention, the receive buffer (308) enables the VNICs to implement bandwidth control. More specifically, when the VNIC is implementing bandwidth control, packets remain in the receive buffer (308) until the VNIC (or an associated process) requests packets from the receive buffer (308). As such, if the rate at which packets are received is greater than the rate at which packets requested by the VNIC (or an associated process), then packets may be dropped from the receive buffer once the receive buffer is full. Those skilled in the art will appreciate that the rate at which packets are dropped from the receive buffer is determined by the size of the receive buffer.

Continuing with the discussion of FIG. 3, the network express manager (300) may be configured to route network traffic between different VNICs located in the blade chassis. In one or more embodiments of the invention, using the virtual switching table (302) in this manner facilitates the creation of a virtual network path, which includes virtual wires (discussed below). Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
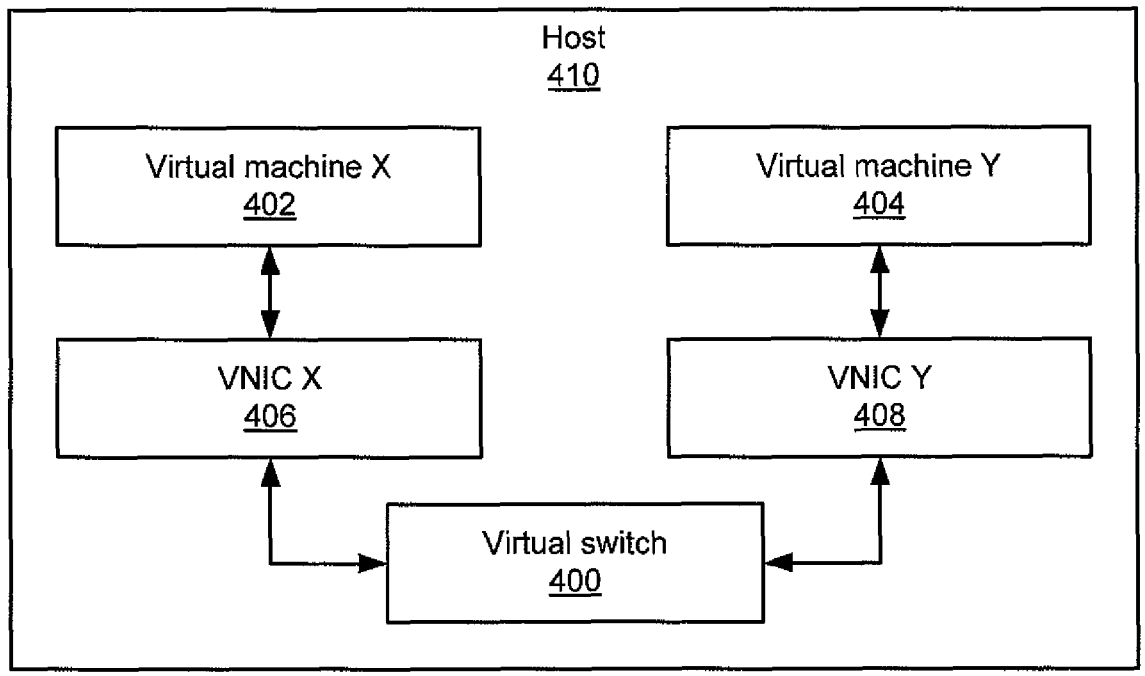
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host (410) within which virtual machine X (402) and virtual machine Y (404) are located. Specifically, the host (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
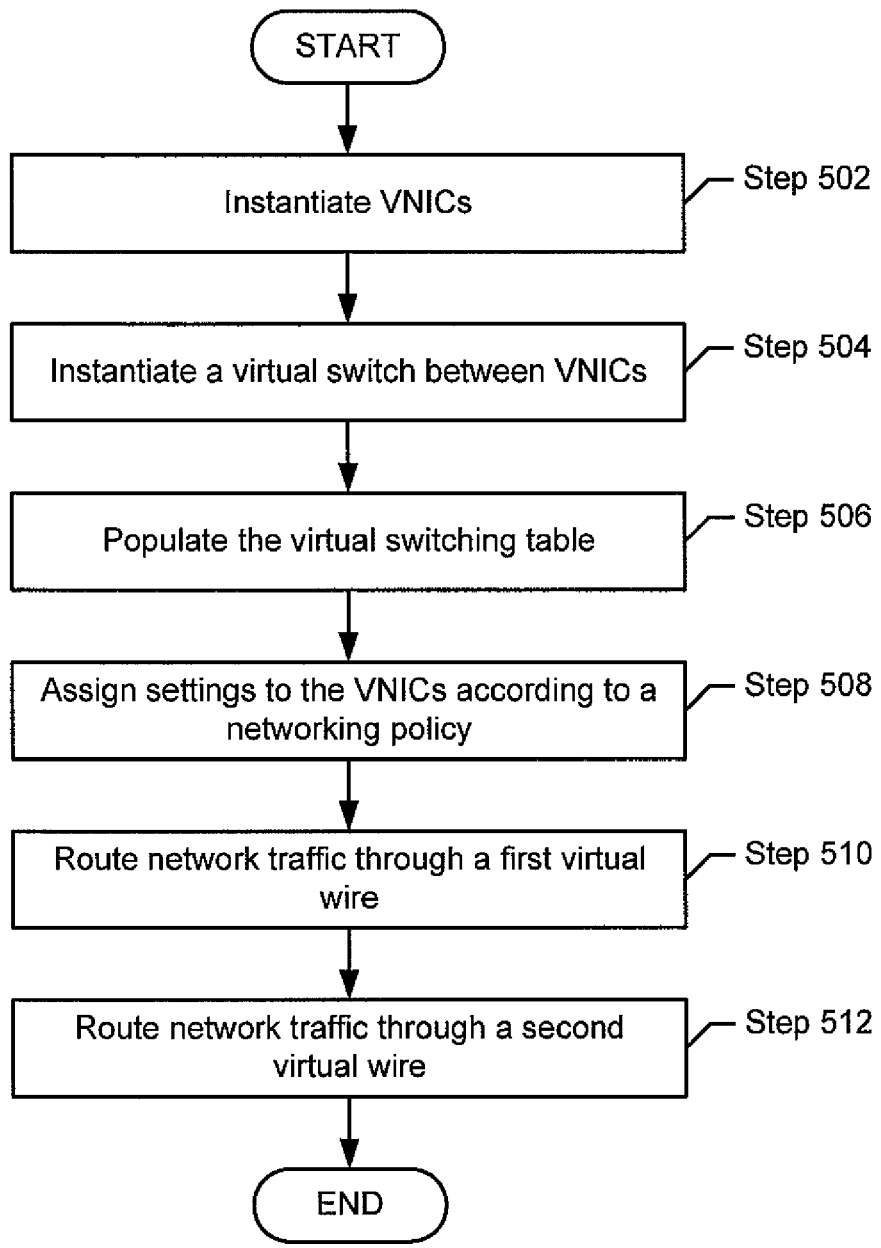
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host, i.e., an operating system that is hosting the virtual machine associated with the VNIC. Registering the VNIC object establishes an interface between the host's networking functionality and the abstraction layer provided by the VNIC. Thereafter, when the host receives network traffic addressed to the VNIC, the host forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480, 261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, IP addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

In one embodiment of the invention, each virtual wire may be associated with a priority (discussed below in FIGS. 9A-9B). In addition, each virtual wire may be associated with a security setting, which defines packet security (e.g., encryption, etc.) for packets transmitted over the virtual wire. In one embodiment of the invention, the bandwidth, priority and security setting are defined on a per-wire basis.

In one embodiment of the invention, a combination of two or more virtual wires may be thought of as a "virtual network path." In one embodiment of the invention, the bandwidth, priority and security settings for all virtual wires in the virtual network path are the same.

Continuing with the discussion of FIG. 5, once the virtual wires and/or virtual network paths have been created and configured, network traffic may be transmitted over the virtual network path through, for example, a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

In one embodiment of the invention, at least Steps 502-508 are performed and/or managed by the control operating system.

Figure 6A:
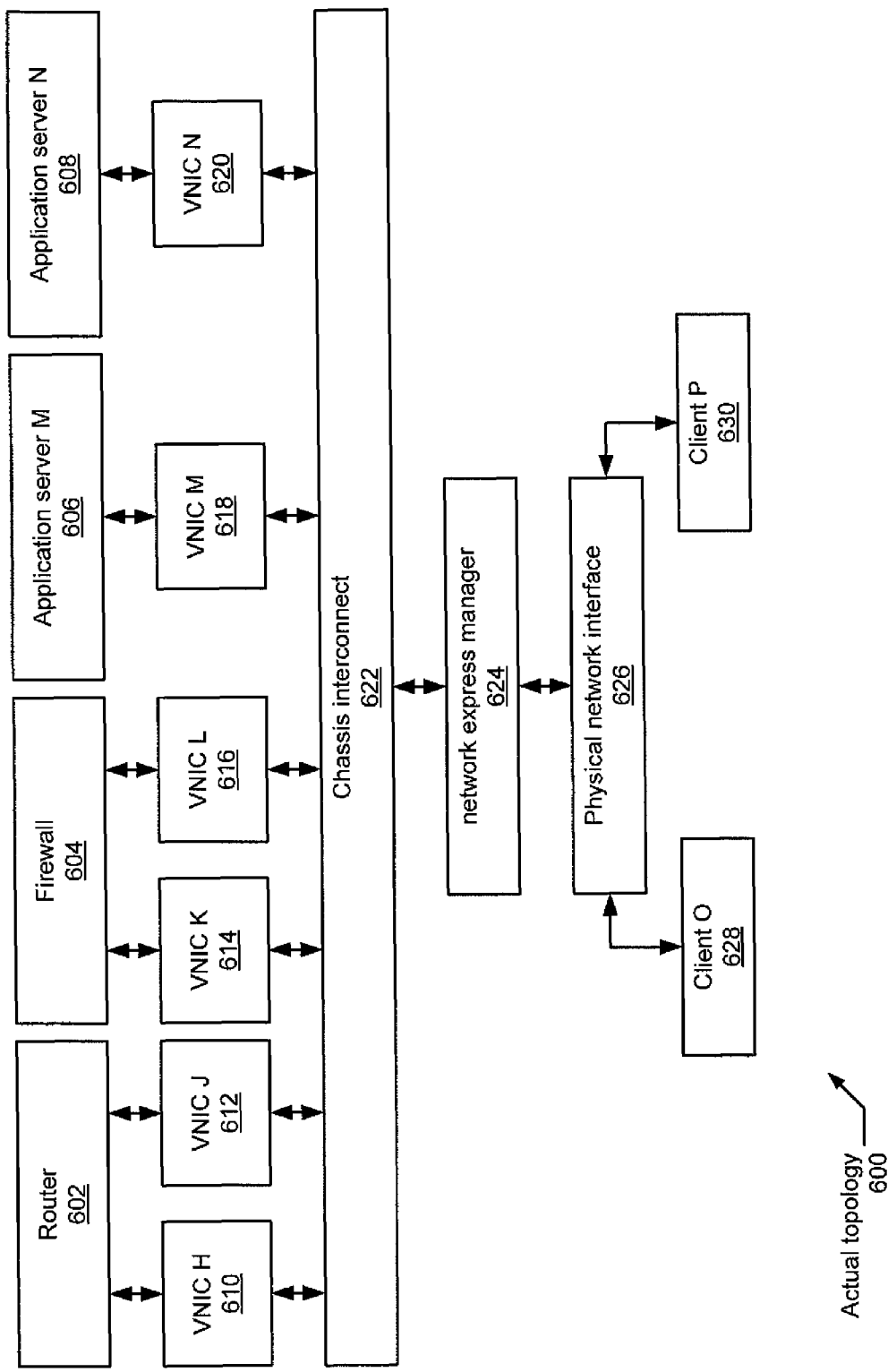
FIGS. 6A-6C show an example of creating virtual network paths in accordance with one or more embodiments of the invention.
Figure 6B:
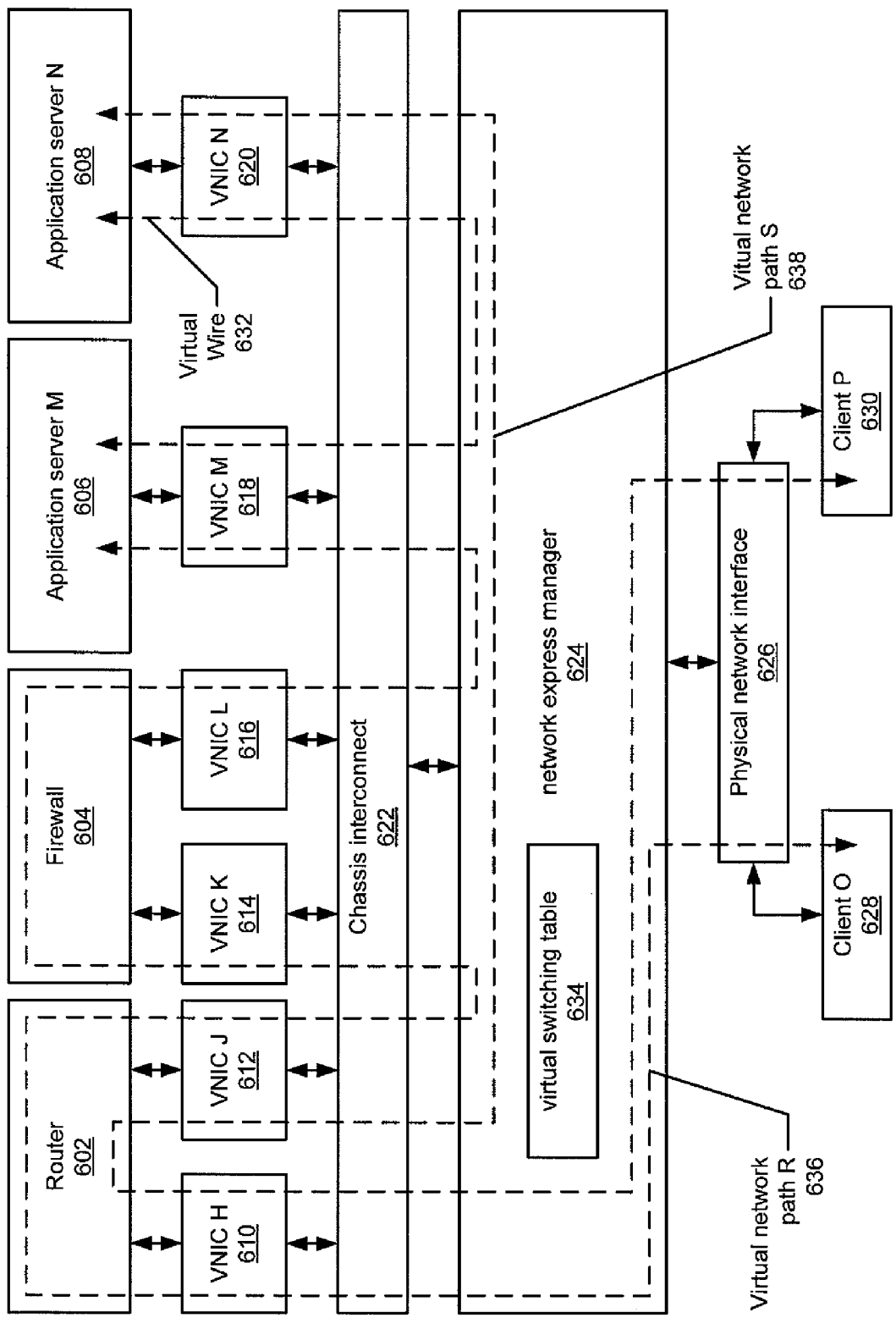
Figure 6C:
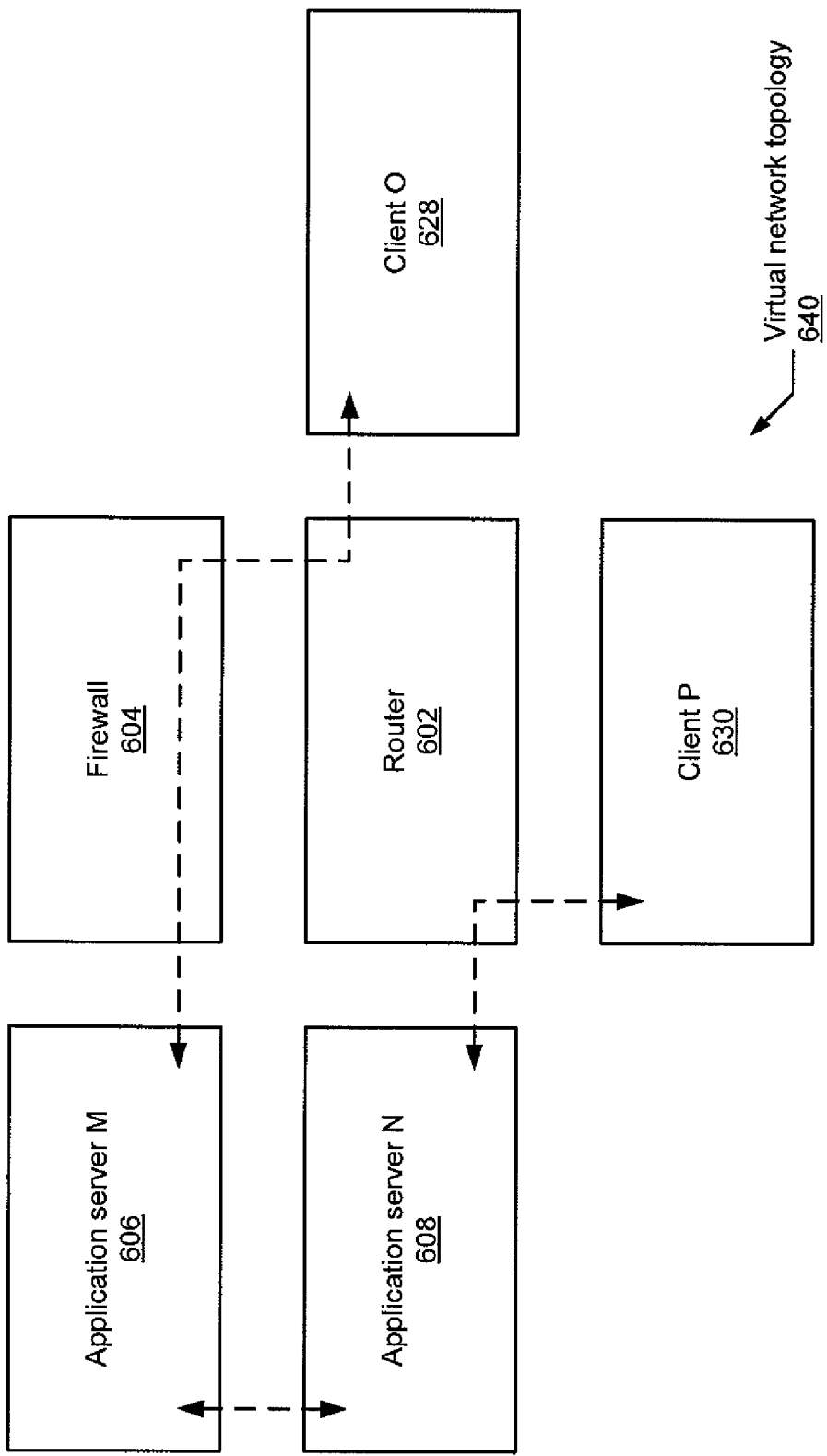

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). As shown in FIG. 6A, each virtual machine is communicatively coupled to all other virtual machines. However, as discussed below, while there is full connectivity between the virtual machines, embodiments of the invention create virtual wires and/or virtual network paths to limit the connectivity of the virtual machines. For ease of illustration, the blades themselves are not shown in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630).

In FIG. 6A, the virtual machines, VNICs, chassis interconnect (622), network express manager (624), and physical network interface (626) are all located within a chassis interconnect. Client O (628) and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be thought of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Embodiments of the invention allow for virtual network paths to be created using virtual wires, without the need for traditional network wires. Specifically, by placing virtual machines in blades coupled via a chassis interconnect, and routing network traffic using VNICs and a virtual switching table, the need for traditional network wires between the virtual machines is avoided. Thus, embodiments of the invention facilitate the creation and reconfiguration of virtual network topologies without the physical labor typically involved in creating a traditional wired network.

As discussed above, embodiments of the invention provide a method and system for creating virtual wires and, by extension, virtual network paths. In one embodiment of the invention, usage statistics may be collected on a per-virtual wire basis (or on a per-network basis). The collected usage statistics may then be analyzed and appropriate actions performed.

Figure 7:
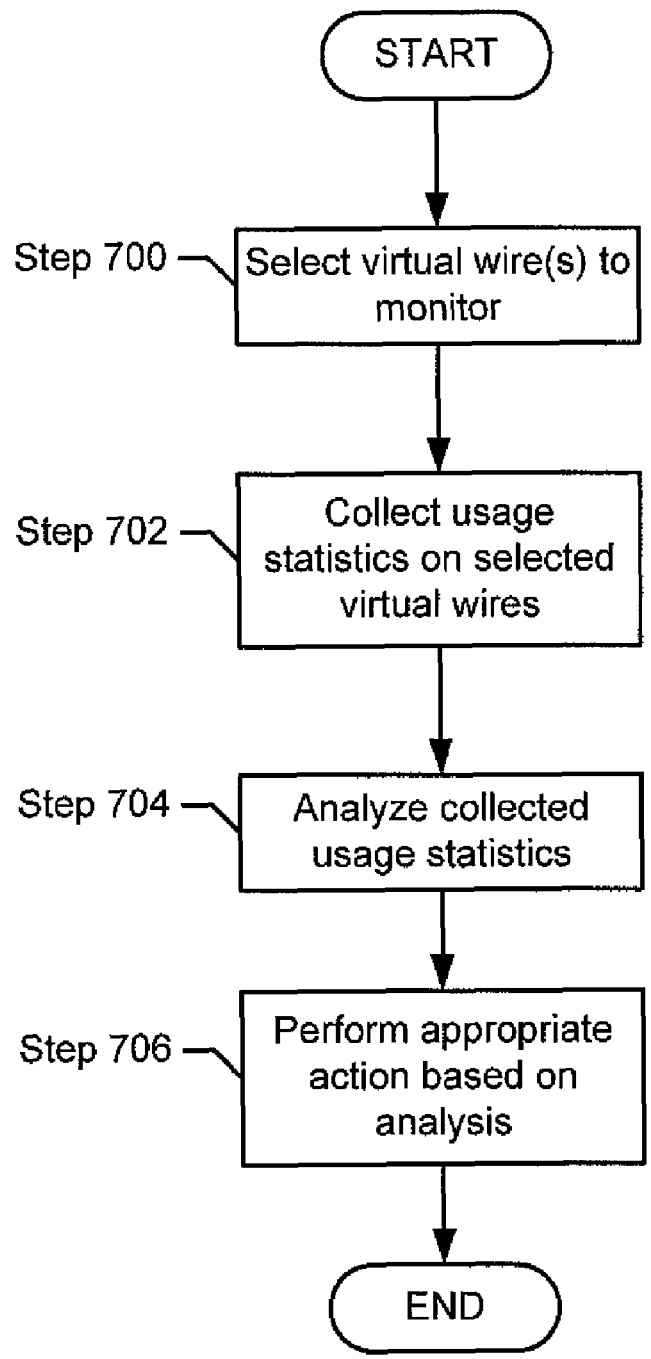
FIG. 7 shows a flowchart of a method for monitoring virtual wires.

FIG. 7 shows a flowchart of a method for monitoring virtual wires. In one or more embodiments of the invention, one or more of the steps shown in FIG. 7 may be omitted, repeated, and/or performed in a different order. Accordingly, embodiments of the invention should not be considered limited to the specific arrangement of steps shown in FIG. 7.

In Step 700, one or more virtual wires are selected for monitoring. In one embodiment of the invention, multiple distinct virtual wires may be selected. Alternatively, multiple virtual wires, which form a virtual network path, may be selected. In one embodiment of the invention, the control operating system is configured to select one or more virtual wires. Alternatively, other virtual machines executing on blades in the blade chassis may include sufficient privileges to select virtual wires for monitoring. In one embodiment of the invention, virtual machines which are associated with VNICs connected by the selected virtual wires may be configured to initiate the selection of the virtual wires.

In Step 702, the usage statistics for the selected virtual wires are collected. In one embodiment of the invention, if a single virtual wire is selected, then usage statistics are collected from VNICs located on either end of the virtual wire. In one embodiment of the invention, if a virtual network path is selected, then usage statistics are collected from VNICs on either end of the virtual network path.

In one embodiment of the invention, usage statistics may include any information about the network traffic received or sent by the specific VNICs being monitored. For example, the usage statistics may include, but are not limited to, number of packets received at one or both of the VNICs being monitored, number of dropped packets at one or both of the VNICs being monitored, the size of the packets received at one or both of the VNICs being monitored, the rate at which packets are received at one or both of the VNICs being monitored, the range of IP addresses of packets received at one or both of the VNICs being monitored.

In one embodiment of the invention, the usage statistics are collected by the control operating system. In another embodiment of the invention, the usage statistics are collected by any virtual machine which has sufficient privileges to access the VNICs being monitored.

In Step 704, the collected usage statistics are analyzed. In one embodiment of the invention, analyzing the collected usage statistics may include reviewing one or more portions of the collected usage statistics to determine if any action is necessary. For example, if the usage statistics include information that includes the number of packets dropped at each of the VNICs being monitored. The analysis may aggregate this information to obtain the average number of packets dropped at each VNIC being monitored. If the average number of packets dropped at each VNIC being monitored is greater than a certain amount, this may trigger an audit (see Step 706). In another example, the analysis may determine a total number of packets from a given IP address (or set of IP addresses) which was communicated over the virtual wire being monitored. This information may be used to generate a billing statement. In one embodiment of the invention, the analysis is performed by the control operating system. Alternatively, the analysis is performed an application executing in a virtual machine located on a blade in the blade chassis. In another embodiment of the invention, the analysis is performed by an application executing on a system external to the blade chassis.

In Step 706, an appropriate action may be performed based on the analysis. In one embodiment of the invention, the appropriate action may correspond to continue monitoring the virtual wire (or virtual network path) or stopping the monitoring of the virtual wire (or virtual network path).

In embodiment of the invention, the action corresponds to auditing the virtual wire or virtual network path. In one embodiment of the invention auditing the virtual wire corresponds to outputting the collected usage statistics such that they may be reviewed manually or automatically (for example using heuristics) to determine whether there is any abnormal activity on the virtual wire.

In one embodiment of the invention, the action corresponds to debugging the virtual wire. In one embodiment of the invention, debugging the virtual wire corresponds to reviewing the configuration of the VNICs on the ends of the virtual wire as well as the configuration of the virtual wire itself to determine why network traffic is not flowing on the virtual wire in the expected manner (e.g., a larger than expected number of packets are being dropped from the virtual wire).

In one embodiment of the invention, the action corresponds to debugging the virtual network path. In one embodiment of the invention, debugging the virtual network path corresponds to reviewing the configuration of the VNICs on the ends of the virtual network path, the configuration of the VNICs within the virtual network path, and the configuration of the virtual wires that make up the virtual network path to determine why network traffic is not flowing on the virtual network path in the expected manner (e.g., a larger than expected number of packets are being dropped from the virtual network path). In addition, debugging the virtual network path includes reviewing the and usage statistics for one or more of the VNICs within the virtual network path.

In embodiment of the invention, the action corresponds to generating a billing statement. In one embodiment of the invention, the billing statement is generated based on the amount of data communicated over the virtual wire or the virtual network path in a certain period of time (e.g., per month). This amount of data communicated over the virtual wire may be determined by counting the number of packets received at one of the VNICs on either end of the virtual wire. Further, the amount of data communicated over the virtual network path may be determined by counting the number of packets received either one of the VNICs on the ends of the virtual network path.

Figure 8A:
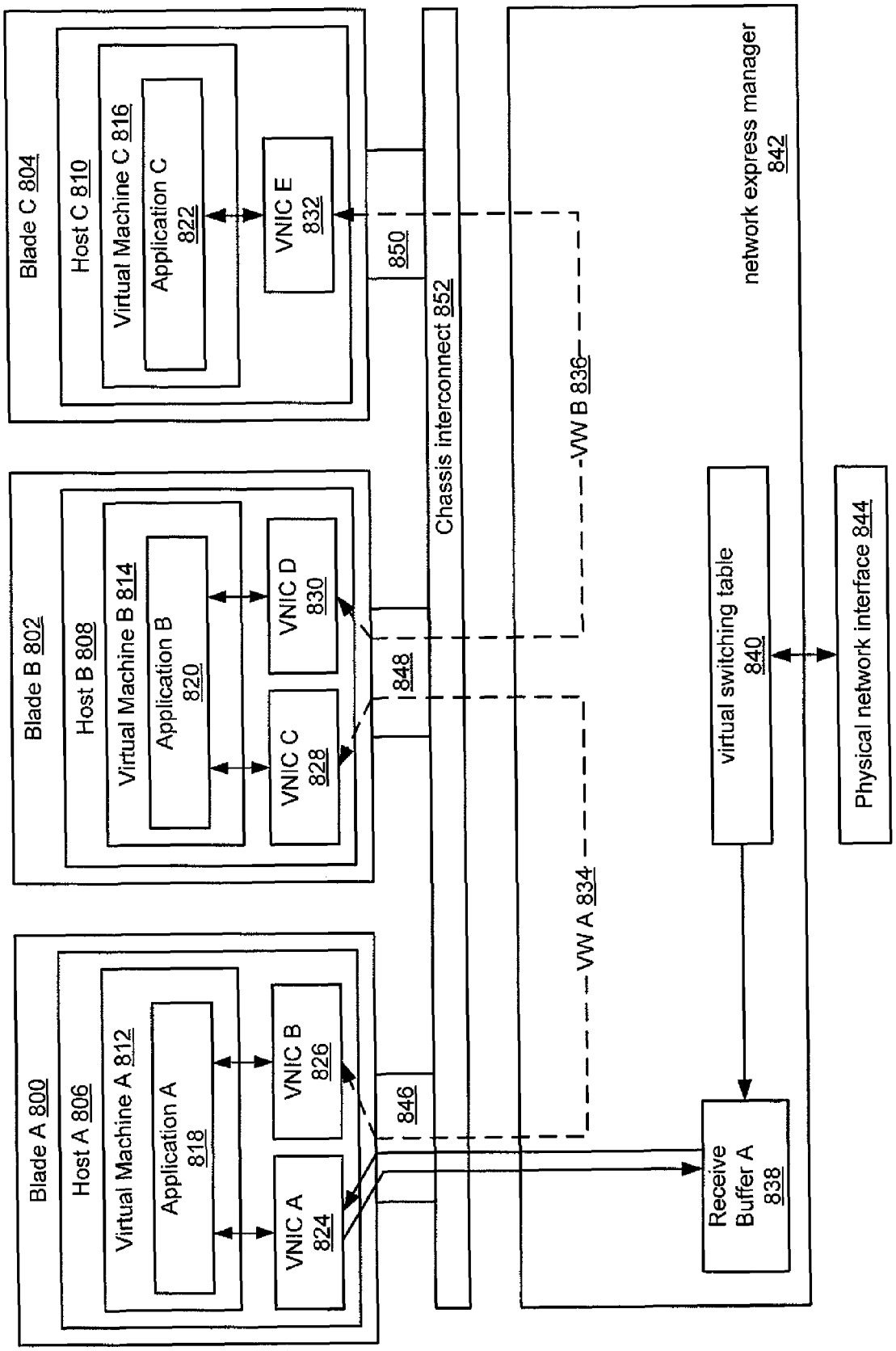
FIGS. 8A-8B show examples of monitoring virtual wires in accordance with one or more embodiments of the invention.
Figure 8B:
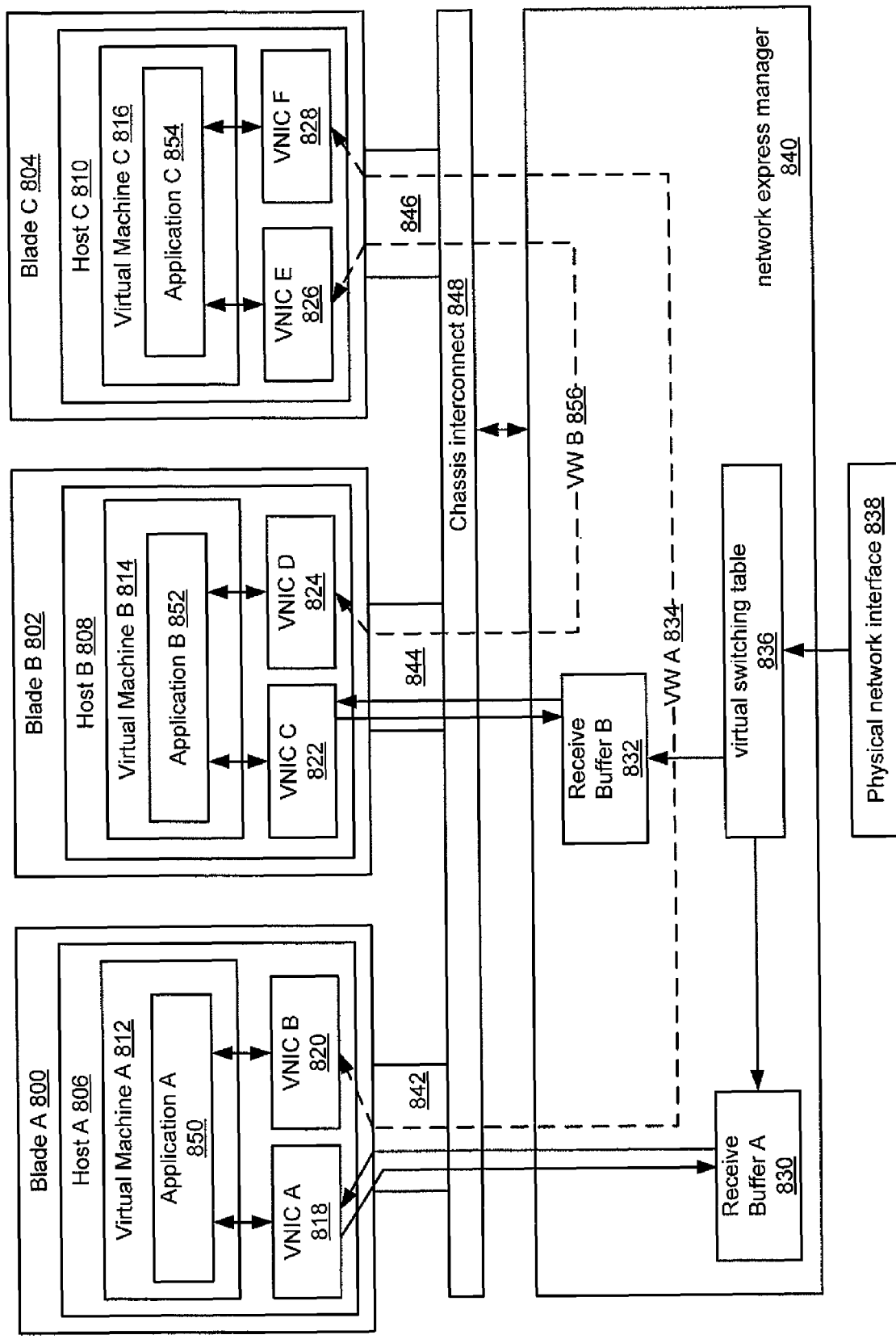

FIGS. 8A-8B show examples of monitoring virtual wires in accordance with one or more embodiments of the invention. FIGS. 8A-8B are provided as examples only, and should not be construed as limiting the scope of the invention.

Regarding FIG. 8A, the blade chassis (not shown) includes three blades (800, 802, 804) connected to a network express manager (842) via a chassis interconnect (852). As shown in FIG. 8A, each blade is physically connected to the chassis interconnect (852) through a separate single physical connection (846, 848, 850).

Blade A (800) includes host A (806). Host A (806) includes virtual machine A (812) executing application A (818) (e.g., a router). Application A (818) sends and receives network traffic from the physical network interface (844) via a virtual network interface (VNIC) A (824). Further, application A (818) sends and receives packets from application B (820) via VNIC B (826) over virtual wire (VW) A (834). VW A (834) is implemented by the virtual switching table (840) in the network express manager (842).

Blade B (802) includes host B (808). Host B (808) includes virtual machine B (814) executing application B (820) (e.g., a firewall). Application B (818) sends and receives network traffic from application A (818) over VW A (834) via VNIC C (828). Further, application B (820) sends and receives packets from Application C (822) via VNIC D (830) over VW B (836). VW B (836) is implemented by the virtual switching table (840) in the network express manager (842). Blade C (804) includes host C (810). Host C (810) includes virtual machine C (816) executing application C (822) (e.g., an application server). Application C (822) sends and receives network traffic from application B (820) over VW B (836) via VNIC E (832).

The network express manager (842) is configured to send and receive network traffic from the physical network interface (844). In this example, the network traffic for application C (822) received by the physical network interface (844) is directed, using the virtual switching table (840), to receive buffer A (838). VNIC A (824) subsequently obtains (via a push or pull mechanism) the network traffic from the receive buffer A (838).

Upon receipt of the network traffic, the VNIC A (824) sends the network traffic to application A (818). Application A (818) subsequently processes the network traffic and then sends at least a portion of the processed network traffic to application B (820) via VNIC B (826) and VW A (834). Upon receipt of the network traffic, the VNIC C (828) sends the network traffic to application B (820). Application B (820) subsequently processes the network traffic and then sends at least a portion of the processed network traffic to application C (822) via VNIC D (830) and VW B (836).

In one embodiment of the invention, VW A (834) and VW B (836) form a virtual network path from application A (812) to application C (816). As discussed above, the usage statistics for the virtual network path may be collected by monitoring the VNICs on the ends of the virtual network path (i.e. VNIC B (826) and VNIC E (832) in FIG. 8A). Further, to debug the virtual network path, usage statistics from VNIC A (824), VNIC B (826), VNIC C (828), VNIC D (830), and VNIC E (832) may be obtained and used.

Regarding FIG. 8B, the blade chassis (not shown) includes three blades (800, 802, 804) connected to a network express manager (840) via a chassis interconnect (848). As shown in FIG. 8B, each blade is physically connected to the chassis interconnect (848) through a separate single physical connection (842, 844, 846).

Blade A (800) includes host A (806). Host A (806) includes virtual machine A (812) executing application A (850). Application A (850) sends and receives network traffic from the physical network interface (838) via virtual network interface (VNIC) A (818). Further, application A (850) sends and receives packets from Application C (854) via VNIC B (820) over virtual wire (VW) A (834). VW A (834) is implemented by the virtual switching table (836) in the network express manager (840).

Blade B (802) includes host B (808). Host B (808) includes virtual machine B (814) executing application B (852). Application B (852) sends and receives network traffic from the physical network interface (838) via VNIC C (822). Further, application B (852) sends and receives packets from Application C (854) via VNIC D (824) over VW B (856). VW B (856) is implemented by the virtual switching table (836) in the network express manager (840).

Blade C (804) includes host C (810). Host C (810) includes virtual machine C (816) executing application C (854). Application C (822) sends and receives network traffic from application A (850) over VW A (834) via VNIC F (828). Application C (822) sends and receives network traffic from application B (852) over VW B (856) via VNIC E (826).

The network express manager (840) is configured to send and receive network traffic from the physical network interface (838). In this example, the network traffic for application C (854) received by the physical network interface (838) is directed, using the virtual switching table (836), to either receive buffer A (830) or receive buffer B (832) depending on the virtual switching table (836).

VNIC A (818) subsequently obtains (via a push or pull mechanism) the network traffic from receive buffer A (830). Upon receipt of the network traffic, the VNIC A (818) sends the network traffic to application A (850). Application A (850) subsequently processes the network traffic and then sends at least a portion of the processed network traffic to application C (854) via VNIC B (820) and VW A (834).

Similarly, VNIC C (822) subsequently obtains (via a push or pull mechanism) the network traffic from receive buffer B (832). Upon receipt of the network traffic, the VNIC C (822) sends the network traffic to application B (852). Application A (852) subsequently processes the network traffic and then sends at least a portion of the processed network traffic to application C (854) via VNIC D (824) and VW B (856).

As discussed above, the usage statistics for the virtual wires may be collected by monitoring the VNICs on the ends of the virtual wires. In the example shown in FIG. 8B, VNIC B (820) and VNIC F (828) may be monitored to obtain usage statistics for VW A (834). Further, VNIC C (822) and VNIC E (826) may be monitored to obtain usage statistics for VW B (856). As shown in FIG. 8B, usages statistics may be obtained on a virtual wire basis while the network traffic is communicated along common physical connections (e.g., 842, 844, 846) and destined for the same physical component (e.g., blade C (804)).

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis bus. Examples of such computers include, but are not limited to, multi-processor servers, network appliances, and light-weight computing devices (e.g., computers that only include memory, a processor, a mechanism to physically connect to and communicate over the chassis bus), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a non-transitory computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising a plurality of executable instructions for monitoring virtual wires, wherein the plurality of executable instructions comprises instructions to:

select a first virtual wire to monitor, wherein the first virtual wire connects a first virtual network interface card (VNIC) located on a first blade to a second VNIC located on a second blade, wherein the first blade and the second blade are connected to a blade chassis, and wherein the first virtual wire is implemented by the blade chassis;

collect usage statistics associated with the first virtual wire; and perform a first action using the collected usage statistics associated with the first virtual wire, wherein the blade chassis comprises a Peripheral Component Interface Express (PCI-E) backplane, a network express manager (NEM), and a virtual switching table (VST), wherein the VST comprises a first mapping of a first Internet Protocol (IP) address for the first VNIC to a first PCI-E endpoint on the PCI-E backplane, and a second mapping of a second IP address for the second VNIC to a second PCI-E endpoint on the PCI-E backplane, wherein the first blade connects to the blade chassis using the first PCI-E endpoint and the second blade connects to the blade chassis using the second PCI-E endpoint and wherein the NEM, using the VST, implements the first virtual wire to only allow packets sent from the first VNIC to be transmitted to the second VNIC.

2. The non-transitory computer readable medium of claim 1, wherein the plurality of executable instructions further comprises instructions to:

select a second virtual wire to monitor, wherein the second virtual wire connects a third VNIC located on the first blade to a fourth VNIC located on a third blade, wherein the third blade is connected to the blade chassis, and wherein the second virtual wire is implemented by the blade chassis;

collect usage statistics associated with the second virtual wire; and perform a second action using the collected usage statistics associated with the second virtual wire, wherein the VST further comprises a third mapping of a third IP address for the third VNIC to the first PCI-E endpoint on the PCI-E backplane, and a fourth mapping of a fourth IP address for the fourth VNIC to a third PCI-E endpoint on the PCI-E backplane, wherein the third blade connects to the blade chassis using the third PCI-E endpoint, and wherein the NEM, using the VST, implements the second virtual wire to only allow packets sent from the third VNIC to be transmitted to the fourth VNIC.

3. The non-transitory computer readable medium of claim 1, wherein the plurality of executable instructions further comprises instructions to:

select a second virtual wire to monitor, wherein the second virtual wire connects a third VNIC located on a third blade to a fourth VNIC located on the second blade, wherein the third blade is connected to the blade chassis, and wherein the second virtual wire is implemented by the blade chassis;

collect usage statistics associated with the second virtual wire; and perform a second action using the collected usage statistics associated with the second virtual wire, wherein the VST further comprises a third mapping of a third IP address for the third VNIC to a third PCI-E endpoint on the PCI-E backplane, and a fourth mapping of a fourth IP address for the fourth VNIC to the second PCI-E endpoint on the PCI-E backplane, wherein the third blade connects to the blade chassis using the third PCI-E endpoint, and wherein the NEM, using the VST, implements the second virtual wire to only allow packets sent from the third VNIC to be transmitted to the fourth VNIC.

4. The non-transitory computer readable medium of claim 1, wherein the action is one selected from a group consisting of auditing the first virtual wire, debugging the first virtual wire, and generating a billing statement for the first virtual wire.

5. The non-transitory computer readable medium of claim 1, wherein the first VNIC is configured to receive network traffic from an application located in a virtual machine executing on the first blade, wherein the application is one selected from a group consisting of a switch, a router, a firewall, and a load balancer.

6. A system comprising:
a physical network interface card (PNIC);
a blade chassis, comprising:
  a Peripheral Component Interface Express (PCI-E) backplane; and
  a network express manager (NEM), comprising a virtual switching table (VST);
a first blade connected to the blade chassis, wherein the first blade comprises a first virtual machine and a first virtual network interface card (VNIC);
a second blade connected to the blade chassis, wherein the second blade comprises a second virtual machine and a second VNIC,
wherein a first virtual wire connects the first VNIC located on the first blade to the second VNIC located on the second blade, wherein the first virtual wire is implemented by the VST of the NEM located in the blade chassis,
wherein the VST comprises:
  a first mapping of a first Internet Protocol (IP) address for the first VNIC to a first PCI-E endpoint on the PCI-E backplane; and
  a second mapping of a second IP address for the second VNIC to a second PCI-E endpoint on the PCI-E backplane;
wherein the first blade connects to the blade chassis using the first PCI-E endpoint and the second blade connects to the blade chassis using the second PCI-E endpoint,
wherein the NEM, using the VST, implements the first virtual wire to only allow packets sent from the first VNIC to be transmitted to the second VNIC, and
wherein the first virtual machine and the second virtual machine are configured to:
  collect usage statistics associated with the first virtual wire; and
  perform a first action using the collected usage statistics associated with the first virtual wire.

7. The system of claim 6, further comprising:
a third blade connected to the blade chassis, wherein the third blade comprises a third virtual machine and a third VNIC,
wherein the first blade further comprises a fourth VNIC,
wherein a second virtual wire connects the fourth VNIC located on the first blade to the third VNIC located on the third blade, wherein the second virtual wire is implemented by the VST of the NEM located in the blade chassis,
wherein the VST further comprises:
  a third mapping of a third IP address for the third VNIC to a third PCI-E endpoint on the PCI-E backplane; and
  a fourth mapping of a fourth IP address for the fourth VNIC to a first PCI-E endpoint on the PCI-E backplane,
wherein the third blade connects to the blade chassis using the third PCI-E endpoint,
wherein the NEM, using the VST, implements the second virtual wire to only allow packets sent from the fourth VNIC to be transmitted to the third VNIC, and
wherein the first virtual machine and the third virtual machine are configured to:
  collect usage statistics associated with the second virtual wire; and
  perform a second action using the collected usage statistics associated with the second virtual wire.

8. The system of claim 6, wherein the first action is one selected from a group consisting of auditing the first virtual wire, debugging the first virtual wire, and generating a billing statement for the first virtual wire.

9. The system of claim 6, wherein the first VNIC is configured to receive network traffic from an application located in the first virtual machine executing on the first blade, wherein the application is one selected from a group consisting of a switch, a router, a firewall, and a load balancer.

10. The system of claim 6, wherein the network express manager further comprises:
a first receive buffer and a first transmit buffer associated with the first VNIC, wherein the first receive buffer is configured to temporarily store packets destined for the first VNIC prior to the first VNIC receiving the packets, and wherein the first transmit buffer is configured to temporarily store packets received from the first VNIC prior to sending the packets toward its packet destination; and
a second receive buffer and a second transmit buffer associated with the second VNIC, wherein the second receive buffer is configured to temporarily store packets destined for the second VNIC prior to the second VNIC receiving the packets, and wherein the second transmit buffer is configured to temporarily store packets received from the second VNIC prior to sending the packets toward its packet destination.

* * * * *